United States Patent
Motyka et al.

(10) Patent No.: US 7,103,528 B2
(45) Date of Patent: Sep. 5, 2006

(54) EMULATED ATOMIC INSTRUCTION SEQUENCES IN A MULTIPROCESSOR SYSTEM

(75) Inventors: Michael Motyka, Tracy, CA (US); Thomas McCaughey, Mountain View, CA (US)

(73) Assignee: LSI Logic Corporation, Milpitas, CA (US)

( * ) Notice: Subject to any disclaimer, the term of this patent is extended or adjusted under 35 U.S.C. 154(b) by 758 days.

(21) Appl. No.: 10/247,996

(22) Filed: Sep. 19, 2002

(65) Prior Publication Data
US 2004/0059563 A1    Mar. 25, 2004

(51) Int. Cl.
*G06F 9/455*    (2006.01)

(52) U.S. Cl. .................. 703/26; 703/27; 711/138; 712/28

(58) Field of Classification Search .......... 703/26, 703/27; 711/138, 152; 714/28, 38; 710/108; 712/28

See application file for complete search history.

(56) References Cited

U.S. PATENT DOCUMENTS

| | | | |
|---|---|---|---|
| 6,430,657 B1* | 8/2002 | Mittal et al. | 711/138 |
| 6,801,986 B1* | 10/2004 | Steely et al. | 711/152 |
| 2002/0082822 A1* | 6/2002 | Noyes | 703/27 |
| 2003/0037223 A1* | 2/2003 | Steely et al. | 712/28 |

OTHER PUBLICATIONS

"A Simpler Solution: Peterson's Algorithm," Person's Algorithm, 1981, pp. 1-2.
"Peterson Pseudo-Code," Electric Sand, 2001, pp. 1.

* cited by examiner

*Primary Examiner*—Thai Phan
(74) *Attorney, Agent, or Firm*—Strategic Patent Group, Inc.

(57) ABSTRACT

A method for enabling access to a resource shared by at least two processors over a bus that supports an atomic instruction, wherein a first processor does not support the atomic instruction, the method comprising the steps of providing an atomic instruction emulator coupled to the bus, the atomic instruction emulator including at least two register sets for implementing an atomic instruction; receiving by the emulator over the bus an emulation request from the first processor to perform the atomic instruction on the shared resource, the request including an address location; and performing by the emulator the atomic instruction for the processor using the data and the address location from the request.

28 Claims, 2 Drawing Sheets

EMULATED ATOMIC INSTRUCTION SEQUENCES IN A MULTIPROCESSOR SYSTEM

FIELD OF THE INVENTION

The present invention relates to multiprocessor systems, and more particularly to a method and system for enabling access to shared resources by the processors in such a system.

BACKGROUND OF THE INVENTION

Multiprocessor systems are becoming increasingly prevalent in even low-cost devices. Multiprocessor environments usually have at least one resource, such as a memory, that is shared by the processors, where access to the shared resource is typically controlled through locks. A lock or semaphore is obtained by a processor to gain exclusive access over a particular location in the shared memory. Through the lock, the processor can without ambiguity, see if the lock is owned and if not, indicate that it owns the lock.

An atomic instruction is implemented using a lock to allow one processor to determine if it was successful in acquiring the lock without interference from another competing processor. Examples of atomic instructions are TAS (Test and Set) and SWAP (SWAP memory contents with register contents).

Another method for achieving the atomic behavior is the method used by MIPS processors that perform a LL (Load Linked), which reads the memory location. The processor then performs an SC (Store Conditional) to write the locked value to the location. The "link" between the two instructions is the address of the memory accessed. The MIPS snoops the bus and the SC instruction fails if the location is accessed between the LL/SC pair.

The SWAP and TAS instructions are well-known element of a processor instruction set, which may be used in an environment where multiple microprocessors and resources are interconnected through a high-speed bus, such as the AHB bus by ARM of the United Kingdom. Any device capable of initiating read and write request over the AHB bus is referred to as a master device, and devices that respond to the requests are referred to as slave devices. The AHB bus supports a locking feature for the master devices. When an AHB master is granted a request for a locked operation, all other masters are prevented from accessing the bus until the locking master releases it.

The ARM SWAP instruction, which is executed by the master devices, is implemented using the AHB bus locking feature lock. The SWAP instruction includes three register names as parameters. The syntax is as follows:

SWAP Rd, Rm, [Rn]

Rd is a destination register that is loaded with the contents of memory; Rm contains a value to be written to memory; and Rn contains an address of the target memory location. In operation, the SWAP instruction performs a read of the memory location pointed to by Rn and saves the result in Rd. Next, a write operation is performed that stores the contents of Rm in the memory location pointed to by Rn.

Atomic instructions are an effective way to share resources in a multiprocessor environment. However, multiprocessor systems that mix different types of microprocessors and digital signal processors (DSPs) are now common. The problem is that not all types of processors and DSPs support an atomic operation.

One attempted solution has been to implement a primitive lock through software only (Peterson's Algorithm). The software only approach suffers several disadvantages, however. One disadvantage is that the approach is slow because each processor must cycle through a variable that enables the processor to proceed to a state in which it is allocated the lock. Another disadvantage is that the algorithm is a polled process where each processor continually issues commands over the bus, which induces unnecessary bus traffic. For these reasons, the algorithm becomes cumbersome as the number of competing processes grows and may degrade overall system performance.

Accordingly, what is needed is a method and system for enabling processors that do not support atomic operations to access shared recourses over a bus that supports a locking feature. The present invention addresses such a need.

SUMMARY OF THE INVENTION

The present invention provides a system and method for enabling access to a resource shared by at least two processors over a bus that supports an atomic instruction, wherein a first processor does not support the atomic instruction. The method and system include providing an atomic instruction emulator coupled to the bus, wherein the atomic instruction emulator includes at least two register sets for implementing the atomic instruction. The emulator receives an emulation request from the first processor over the bus to perform the atomic instruction on the shared resource, where the request includes an address location. The method and system further include performing by the emulator, the atomic instruction for the processor using the data and the address location from the request.

According to the system and method disclosed herein, the present invention allows processors, such as DSPs, that do not support the atomic instruction supported by a bus to effectively execute the atomic instruction, such as a SWAP, through the use of a specialized hardware emulator.

DETAILED DESCRIPTION

The present invention relates to emulating atomic instruction sequences. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides a hardware peripheral that emulates atomic operations to allow non-complying processing devices to participate in a multiprocessor environment that supports atomic instructions, thereby simplifying and improving the performance of processing devices that do not. The present invention will be described in terms of a preferred embodiment that uses an ARM AHB bus. However, as those with ordinary skill will readily understand, any type of bus that supports atomic instructions may be used.

Figure 1:
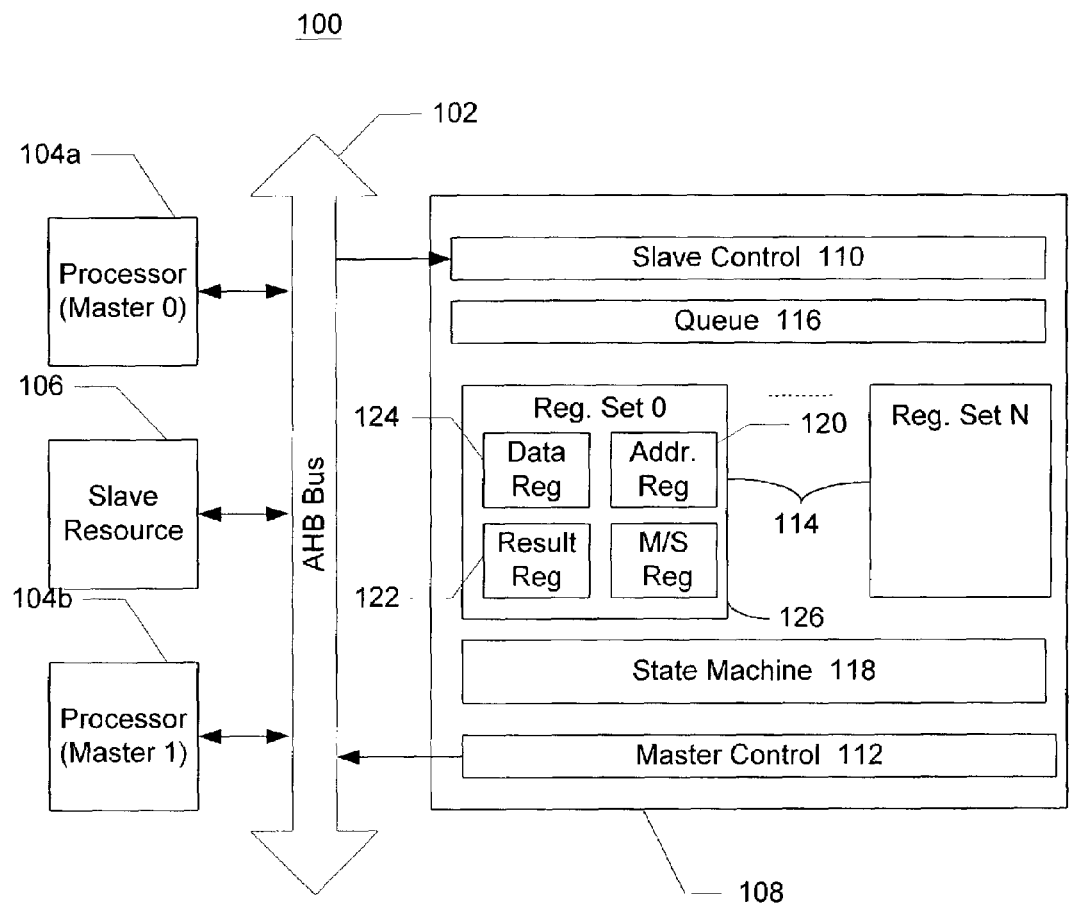
FIG. 1 is a block diagram illustrating an atomic instruction emulator system in a preferred embodiment of the present invention.

FIG. 1 is a block diagram illustrating an atomic instruction emulator system in a preferred embodiment of the present invention. The system 100 includes a bus 102 (e.g., AHB), multiple processing devices 104 coupled to the bus 102, and at least one shared resource 106 (e.g., memory). The processing devices 104 may represent any type of processor or CPU that initiate read and write requests over the bus 102. Any such device is referred to as a bus master. Devices, that respond to those requests, such as the shared resource 106, are referred to as bus slaves. In the example shown in FIG. 1, assume that processor 104a (Master 0) is a processor that supports an atomic instruction standard supported by the bus 102, such as a SWAP, for gaining exclusive access to an address in the shared resource 106. Assume further that processor 104b (Master 1) does not support the atomic instruction standard.

The present invention allows the non-complying processor to participate in the atomic instruction multiprocessor environment by providing a hardware atomic instruction emulator device 108 on the bus 102 that emulates atomic instructions for the processor(s) 104b that do not support the atomic instruction. In a preferred embodiment, the atomic instruction emulator 108 includes a slave control 110, a master control 112, N register sets 114 for implementing an atomic instruction sequence, a queue 116, and a state machine 118.

The slave control 110 is a bus interface for receiving requests from the bus 102, while the master control 112 is a bus interface for controlling and writing data out over the bus 102. The queue 116 is for queuing requests as they are received, preferably in first-in-first-out (FIFO) order.

Each register set 114 is assigned to a particular processor 104b and is used as a single SWAP emulator for that processor 104b. The state machine 118, the register sets 114, and the master control 112 perform an atomic instruction pair on the behalf of the requesting processor 104b, as described in FIG. 2 below.

In a preferred embodiment, the number of register sets 114 in the emulator 108 is equal to the number of processors 104 available on the bus 102 that do not support atomic instructions. For example, in an implementation where an AHB bus includes fifteen masters that do not support the atomic instruction, the emulator device 108 would include fifteen register sets 114.

Each register set 114 includes an address register 120 for holding an address pointer, a result register 122 for storing data read from the specified address, and a data register 124 for storing the data to be written to the address. Each register set 114 may also include a mode/status register 126. In a preferred embodiment, the atomic instruction emulator 108 implements the registers as follows:

| Name | Description |
| --- | --- |
| RN | 32-bit address pointer register |
| RD | result register (32-bit) - holds memory contents prior to write |
| RM | data register (32-bit) - holds the data to write to memory |
| MS | Mode/Status register - see below |

Mode/Status Register Bit Assignments:
2 Error—an error was generated on the system bus and the swap transfer aborted
1 Reset—resets a lost state machine
0 Valid—goes low after a write to RN goes high after execution is complete In a preferred embodiment, the status bit for a register set is also an actual hardware output from the device 108 that is available to the rest of the system (for interrupt controller user as an example).

Figure 2:
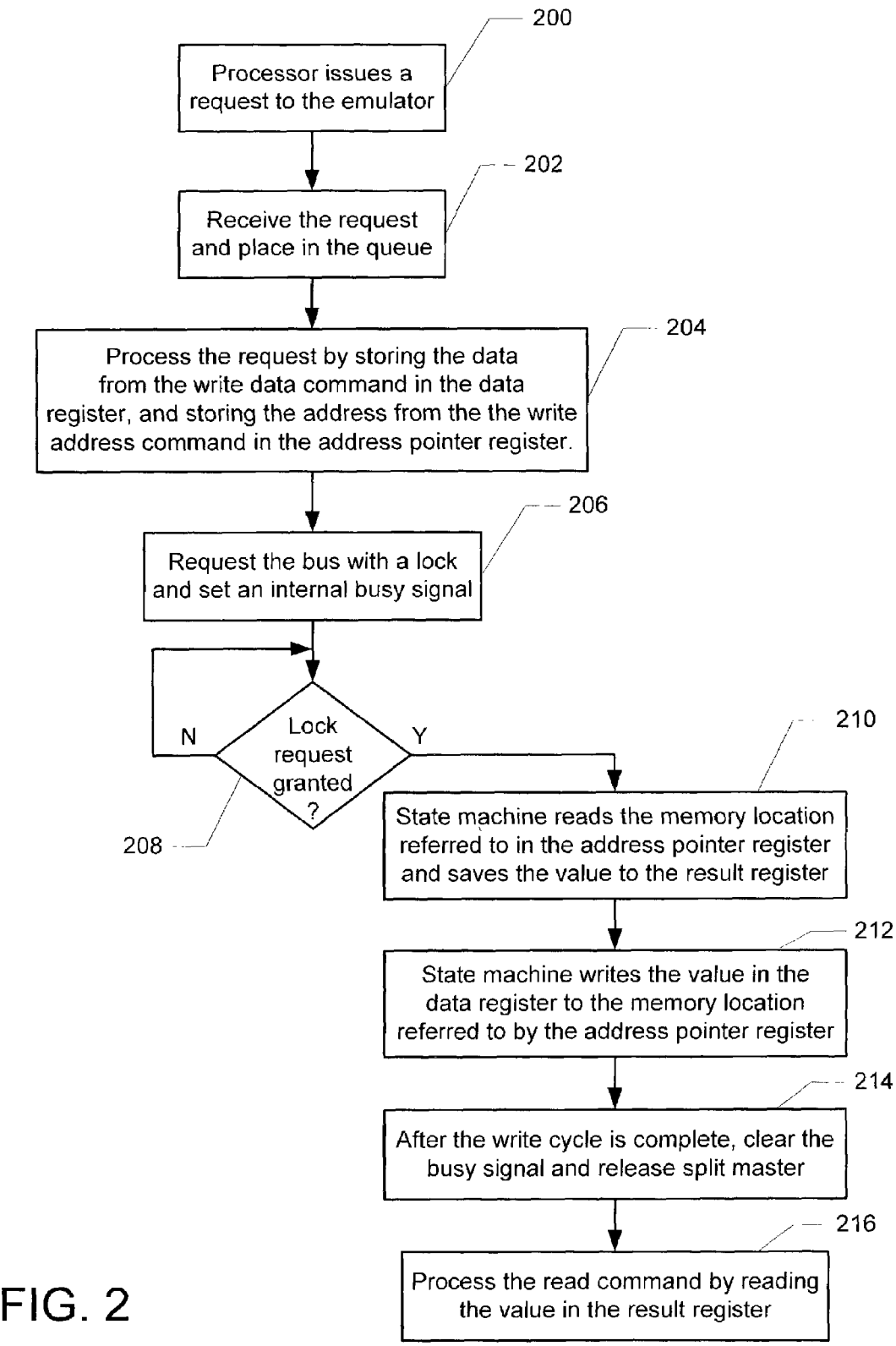
FIG. 2 is a flow diagram illustrating the process of using a hardware device to emulate an atomic instruction (e.g., SWAP) for a processor that does not support atomic instructions in a multiprocessor environment.

FIG. 2 is a flow diagram illustrating the process of using a hardware device to emulate an atomic instruction (e.g., SWAP) for a processor that does not support the instruction in a multiprocessor environment in one preferred embodiment. The process begins in step 200 when a non-complying processor 104b issues an emulation request to the emulator 108 over the bus 102 to perform the atomic instruction on the shared resource 106. In a preferred embodiment, the request comprises separate commands specifying the operations to be performed on the register set 104 assigned to the processor 104b. The request may include a write command to write data to the data register 124, a write address command to write an address pointer to the address register 120, and a read command to read the results register 122. In addition, the processor 104b may also issue a command to write to the mode/status register if applicable.

In step 202, the slave control 110 receives the request and places the request in the queue 116. In a preferred embodiment, the receipt of the write address command triggers the queuing of the request. Assuming there are no pending requests in the queue 116, in step 204 the request is processed by storing the data from the write data command to the data register 124 and storing the address pointer from the write address command to the address register 120.

Upon a value being written to the data and pointer registers 124 and 120, the master control 112 requests the bus 102 with a lock and sets an internal busy signal in step 206. While the emulating device 108 is busy, the address pointer register 120, the result register 122, and the data register 124 cannot be written to. If a master 104 attempts to read the contents of the result register 122 while the emulator 108 is in the busy state, the master 104 is SPLIT, meaning that is held off from completing the read by an arbiter. The ability to generate SPLIT transactions is important, since without this feature, each master 104 would be required to continually poll the corresponding busy bit. This additional bus traffic could substantially affect performance when the number of processing elements is large.

If the bus grants the lock request in step 208, then in step 210–216 the state machine 118 generates an atomic instruction sequence that will implement a SWAP instruction. First, in step 210 the state machine 118 reads the memory location referred to in the address register 120 and saves the value to the result register 122. In step 212, the state machine 118 then writes the value in the data register 124 to the memory location referred to by the address pointer register. After the write cycle is complete, the busy state is cleared and the split master is released in step 214. In step 216 the emulator 108 processes the read command from the processor 104b by reading the value in the result register, and returning the value through the master control 112 to the requesting processor 104b.

If the emulator 108 loses control over the bus 102 between the read and write transactions, the entire process must be restarted to maintain coherency. A write to the Reset bit in the mode/status register 126 at any time terminates the operation (cleanly) and clears the emulator device 108.

In an alternative embodiment, the non-complying processors 104b could be notified that the atomic instruction sequence was completed using a valid bit and an interrupt controller (not shown). This way the processor 104b could continue to execute tasks while waiting to read the result.

In a further embodiment, the state machine 118 could perform a modify command between the read and write instructions (steps 212 and 214). An example would be an increment or decrement function for performing counting operations on the data written to the shared resource.

An atomic instruction emulator has been described that performs atomic instructions for processors that do not support the instruction by performing a Read-Write operation in two distinct bus operations, but which behaves like an atomic operation because the bus supports a locking feature.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for enabling access to a resource shared by at least two processors over a bus that supports an atomic instruction, the method comprising the steps of:
   (a) providing an atomic instruction emulator coupled to the bus, the atomic instruction emulator including at least two register sets for implementing an atomic instruction;
   (b) receiving by the emulator over the bus an emulation request from the first processor to perform the atomic instruction on the shared resource, the request including an address location, wherein the first processor does not support the atomic instruction; and
   (c) performing by the emulator the atomic instruction for the first processor using the data and the address location from the request.

2. The method of claim 1 wherein step (a) further includes the step of: assigning a respective register set to each processor requiring service from the atomic instruction emulator.

3. The method of claim 2 wherein step (a) further includes the step of providing the emulator with a number of register set is equal to the number of processors available on the bus.

4. The method of claim 1 wherein each register set includes an address register for holding an address pointer, a result register far storing data read from the specified address, and a data register for storing the data to be written to the address.

5. The method of claim 4 wherein the request comprises separate commands specifying operations to be performed on the register set assigned to the processor.

6. The method of claim 5 wherein the request includes a write command to write data to the data register, a write address command to write an address pointer to the address register, and a read command to read the results register.

7. The method of claim 5 wherein step (b) further includes the step of queuing requests received from multiple processors.

8. The method of claim 5 wherein step (b) further includes the step of: processing the request by storing the data from the write data command to the data register and storing the address pointer from the write address command to the address register.

9. The method of claim 1 wherein step (c) further includes the step of: requesting the bus with a lock and setting an internal busy signal.

10. The method of claim 9 further including the step of: splitting any master that attempts to read the contents of the result register while the emulator is in the busy state.

11. The method of claim 9 further including the step of: if the lock is granted, using a state machine to generate an atomic instruction sequence for the processor.

12. The method of claim 11 further including the step of: performing a write instruction to write the value in the data register to an address location referred to by the address pointer register.

13. The method of claim 12 further including the step of: a read instruction to read the value in the result register.

14. The method of claim 12 further including the step of: clearing the busy state and any split masters after the write cycle is complete.

15. The method of claim 12 further including the step of: performing a modify command between the read and write instructions to perform counting operations on the data written to the shared resource.

16. The method of claim 1 further including the step of: notifying the processor that the atomic instruction sequence has completed using an interrupt controller.

17. An atomic instruction emulator, comprising:
   a slave control for receiving a request to perform an atomic instruction on a shared resource on a bus that supports an atomic instruction from at least one processor coupled to the bus that does not support the atomic instruction;
   at least one register set for implementing an atomic instruction sequence by storing data and an address within the shared resource specified in the request;
   a state machine for performing an atomic instruction pair on the behalf of the non-complying processor by
      obtaining a bus lock,
      reading a value from the address of the shared resource pointed to by the address stored in the register set and saving the value in a register within the register set,
      writing the data stored in the register set to the address of the shared,
      and reading the value saved in the register in the register set; and a master control for returning the value to the requesting processor.

18. The atomic instruction emulator of claim 17 further including a queue for queuing requests received over the bus.

19. The atomic instruction emulator of claim 18 wherein a respective register set is assigned to each processor on the bus requiring emulation service.

20. The atomic instruction emulator of claim 19 wherein the emulator includes a number of register sets equal to the number of processors available on the bus.

21. The atomic instruction emulator of claim 20 wherein each register set includes an address register for holding an address pointer, a result register for storing data read from the specified address, and a data register for storing the data to be written to the address.

22. The atomic instruction emulator of claim 21 wherein the request comprises separate commands specifying operations to be performed on the register set assigned to the processor.

23. The atomic instruction emulator of claim 22 wherein the request includes a write command to write data to the data register, a write address command to write an address pointer to the address register, and a read command to read the results register.

24. An atomic instruction emulator system, comprising:
   a bus that supports an atomic instruction;
   at least one master device coupled to the bus that supports the atomic instruction;
   at least one master device coupled to the bus that does not support the atomic instruction;
   a slave resource coupled to the bus that is shared by the master devices; and
   a hardware emulator for emulating the atomic instruction for the master device that does not support the atomic instruction, the emulator including,
      a queue for queuing multiple incoming emulation requests from the master devices that do not support the atomic instruction, each request specifying an address within the shared resource and data to write to that address,
      N register sets, assigned to respective masters on the bus that do not support the atomic instruction, each register set for storing the address and data from the request received from the respective master device, and
      a state machine for performing the atomic instruction on behalf of the requesting master device using the address and data stored in the corresponding register set.

25. The system of claim 24 wherein the emulator further includes a slave control and master control for interfacing with the bus.

26. The system of claim 25 wherein each register set includes an address register for holding an address pointer, a result register for storing data read from the specified address, and a data register for storing the data to be written to the address.

27. The system of claim 26 wherein the request comprises separate commands specifying operations to be performed on the register set assigned to the processor.

28. The system of claim 27 wherein the request includes a write command to write data to the data register, a write address command to write an address pointer to the address register, and a read command to read the results register.

* * * * *